United States Patent [19]

Rinkewich

[11] Patent Number: 4,889,758
[45] Date of Patent: Dec. 26, 1989

[54] HIGH-STRENGTH PANEL STRUCTURE

[76] Inventor: Isaac Rinkewich, 48-22 Garden View Ter., Hightstown, N.J. 08520

[21] Appl. No.: 174,921

[22] Filed: Mar. 29, 1988

[51] Int. Cl.$^4$ .................. B32B 1/00; D01D 5/20; B28B 1/02
[52] U.S. Cl. ..................... 428/178; 428/99; 428/116; 428/174; 428/179; 428/180; 428/188; 428/223; 428/294; 264/167; 264/209.2; 264/310; 52/268; 52/450; 52/454; 52/792; 52/806; 52/808
[58] Field of Search ............ 52/792, 801, 334, 336, 52/391, 296, 268, 450–454, 795, 799, 806, 808; 428/178, 179, 180, 99, 174, 182, 183, 188, 176, 294, 223, 336, 116, 180; 264/310, 165, 167, 209.1, 209.2

[56] References Cited

U.S. PATENT DOCUMENTS

| | | | |
|---|---|---|---|
| 2,549,189 | 4/1951 | Gabo | 428/116 |
| 3,011,602 | 12/1961 | Ensrud et al. | 428/180 |
| 3,086,899 | 4/1963 | Smith et al. | 428/178 |
| 3,258,892 | 7/1966 | Rushton | 52/792 |
| 3,575,781 | 5/1969 | Pezely | 428/180 |
| 3,651,182 | 3/1972 | Rosenthal | 428/315.5 |
| 4,203,268 | 5/1980 | Gladden et al. | 428/178 |
| 4,397,247 | 8/1983 | Lemelson | 108/57.1 |
| 4,495,237 | 1/1985 | Patterson | 428/178 |
| 4,614,000 | 9/1986 | Mayer | 428/178 |
| 4,698,864 | 10/1987 | Graebe | 5/455 |
| 4,749,606 | 6/1988 | Moore | 428/80 |

FOREIGN PATENT DOCUMENTS

| | | | |
|---|---|---|---|
| 685454 | 4/1964 | Canada | 428/180 |
| 0105537 | 11/1983 | Japan | 428/116 |
| 709279 | 5/1954 | United Kingdom | 428/180 |

*Primary Examiner*—Ellis P. Robinson
*Assistant Examiner*—Donald J. Loney
*Attorney, Agent, or Firm*—Benjamin J. Barish

[57] ABSTRACT

A panel having high strength relative to its weight is made of rigid material and is formed with a plurality of open cells, each open at one side, and with a plurality of closed cells, each closed on all sides. Each of the open cells is surrounded on all its sides by a plurality of the closed cells, and each of the closed cells is surrounded on all its sides by a plurality of the open cells.

19 Claims, 2 Drawing Sheets

HIGH-STRENGTH PANEL STRUCTURE

BACKGROUND OF THE INVENTION

The present invention relates to a panel structure having high-strength relative to its weight, and particularly to a panel having a cellular or honeycomb structure of relatively high-strength.

Panels of cellular or honeycomb structure are commonly used for various applications, such as in pallets, truck bodies, walls, partitions, containers and the like, where it is desired to achieve the greatest mechanical strength relative to weight. The present techniques for fabricating such cellular or honeycomb structures are generally slow and costly, since they usually involve the tedious work of manual welding, glueing or cementing the various elements to produce the panel structure.

An object of the present invention, is to provide a novel panel structure having high strength relative to its weight.

Another object of the invention is to provide a high-strength panel structure which can be constructed at relatively low cost and in volume.

BRIEF SUMMARY OF THE INVENTION

According to the present invention, there is provided a panel, having high strength relative to its weight, made of rigid material integrally moulded with a rectangular matrix of longitudinally and transversely extending cells, each including side and face walls. The matrix of cells comprises a plurality of separate and distinct open cells, each open one face of the panel; and a plurality of separate and distinct closed cells, each closed on all sides and having face wall on the opposite face of the panel. Each of the cells is surrounded on all its sides by side walls of a plurality of the closed cells; and each of the closed cells is surrounded on all its sides by side walls of a plurality of the open cells.

According to further features in the preferred embodiments of the invention described below, the face of the panel including the face walls of the closed cells is uninterrupted and is constituted of a face wall of all the closed cells alternating with a face wall of at least some of the open cells.

Two embodiments of the invention are described below for purposes of example.

In one described embodiment the first mentioned face of the panel includes a plurality of open cells of different configurations symmetrically distributed over the respective face of the panel. In this described embodiment, some of the open cells are of circular cross-section, some are of rectangular cross-section. The rectangular open cells include cells of square cross-section and cells of elongated-rectangular cross-section, the latter having a pair of short sides, each of a length equal to the diameter of the cells of circular cross-section, and a pair of long sides each of a length equal to the length of each side of the cells of square cross-section.

In a second described embodiment, both the open and closed cells are of the same configuration. More particularly, both types of cells are of square pyramidal configuration, the open cells having an open side at one face of the panel, and the closed cells having face walls of the open and closed cells at the opposite face of the panel.

According to another feature of the invention, the walls of the open cells separating them from the closed cells may be straight, or may be stepped to provide resistance against buckling in compression.

Panels constructed in accordance with the foregoing features provide very high strength relative to their weight. In addition, such panels may be constructed in volume and at relatively low cost by rotational moulding.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
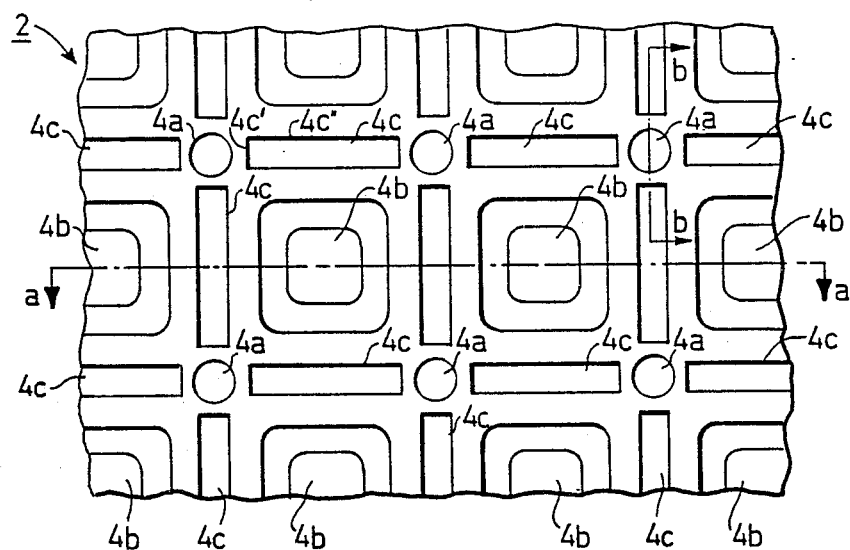
FIG. 1 is a fragmentary view illustrating the bottom face of one form of panel constructed in accordance with the present invention.
Figure 1A:
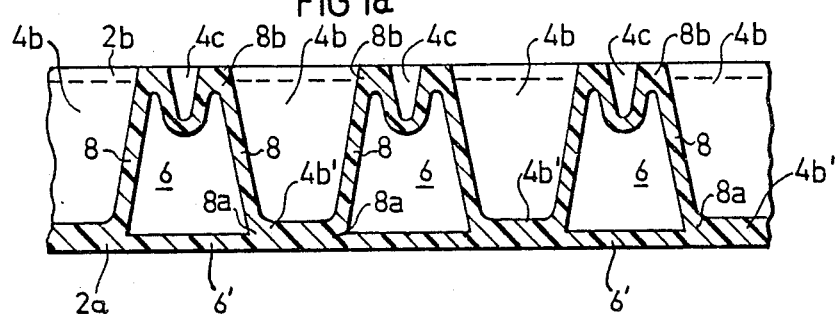
FIGS. 1a and 1b are sectional views along lines a—a and b—b, respectively, of FIG. 1.
Figure 1B:
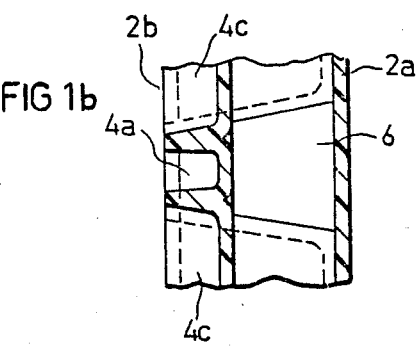

The Embodiment of FIGS. 1, 1a, 1b.

The panel of FIGS. 1, 1a, 1b, therein generally designated 2, is integrally moulded of a rigid plastic material, such as polyethylene, polyurethane, or foamed polyurethane, formed with a rectangular matrix of longitudinally and transversely extending cells, each including side and face walls. The matrix of cells comprises plurality of open cells 4a, 4b, 4c, and with a plurality of closed cells 6, each of the open cells (e.g., 4a) being surrounded on all its sides by a side wall 8 of plurality of the closed cells 6, and with each closed cell surrounded on all its sides by the side walls 8, being also the side walls of a plurality of the open cells. Face 2a of the panel is uninterrupted and is constituted of a wall of all the closed cells 6 and a wall of at least some of the open cells. Face 2b of the panel is ribbed and includes an open side of all the open cells alternating with the opposite face wall of the closed cells along longitudinal and transverse lines of the panel.

More particularly, the illustrated panel includes three types of open cells, namely: (1) open cells 4a of circular cross-section; (2) open cells 4b of square cross-section; and (3) open cells 4c of elongated-rectangular cross-section. All the open cells 4a, 4b, 4c are open at face 2b of the panel, so as to impart an interrupted or ribbed surface to that face of the panel. Open cells 4a and 4c extend only for a part of the thickness of the panel, whereas open cells 4b extend for substantially the complete thickness of the panel, such that face 2a of the panel is constituted of one wall 6' of all the closed cells 6, and one wall 4b' of all the open cells 4b.

In the illustrated embodiment, both faces 2a and 2b of the panel 2 are flat. It will be appreciated, however, that in some applications one or both of these faces could be rounded.

As shown in FIG. 1, the elongated-rectangular open cells 4c have a pair of short sides 4c' of a length each equal to the diameter of the circular open cells 4a, and a pair of long sides 4c" each equal to the length of each side of the square open cells 4b. The short sides 4c' of cells 4c are aligned with the circular cells 4a, and the along sides 4c" of cells 4c are aligned with the square cells 4b.

As also shown in FIG. 1, the open sides of the open cells 4a, 4b and 4c open at face 2b of the panel, and are arranged in two groups of lines alternating with each other. One group of lines include the circular cells 4a alternating with the elongated rectangular cells 4c, whereas the second group of lines include the square cells 4b alternating with the elongated rectangular cells 4c.

As shown particularly in FIGS. 1a and 1b, all the cells are of tapered configuration. Thus, open cells 4a of circular cross-section are of conical configuration with the base of the cone open at face 2b of the panel; open cells 4b are of pyramidal configuration, with the base of the pyramid, being of largest dimension, at face 2b of the panel; and the open cells 4c are of generally wedge-like configuration, with their largest dimension being at face 2b of the panel. The closed cells 6 are of generally pyramidal configuration, with their bases (wall 6'), being of largest dimension, at face 2a of the panel.

As shown particularly in FIG. 1a, walls 8 between the open cells 4b and the closed cells 6 are straight and of uniform thickness for substantially their complete lengths, but are thickened somewhat at their outer ends 8a, 8b adjacent to the two faces, 2a, 2b of the panel.

The panel illustrated in FIGS. 1, 1a, 1b may be produced at relatively low cost by rotation moulding, in which the plastic material in powdered form is introduced in a closed metal mould while the mould is heated to melt the material. At the same time, the mould is rotated around all its axes, and/or is ultrasonically vibrated, in order to promote adhesion of the melted plastic material to the inner faces of the mould. Such a technique may be used for producing the panel having the open cells 4a, 4b, 4c, and the closed cells 6, with the walls of the cells of the appropriate thickness as determined by the amount of powdered plastic material introduced into the mould.

The panel illustrated in FIGS. 1, 1a and 1b is of relatively low weight because of its cellular construction, yet has a high degree of strength because of the increased overall thickness of the panel which increases the moment of inertia. The illustrated construction has been found particularly suitable for panels having a thickness of 5-10 cm.

The Embodiment of FIGS. 2, 3, 3a, 3b

FIGS. 2, 3, 3a, 3b illustrate a construction for a panel, generally designated 20, particularly suitable for thicker panels, in the order of 10-25 cm. in thickness.

The panel of FIGS. 2, 3, 3a, 3b is also integrally moulded of a rigid plastic material, such as polyethylene, polyurethene or foamed polyurethane, formed with a plurality of open cells 24 each open at one side, and a plurality of closed cells 26. In the panel 20 illustrated in FIGS. 2, 3, 3a, 3b as in the panel of FIG. 1, each of the open cells 24 is surrounded on all its sides by a plurality of the closed cells 26, and each of the closed cells 26 is surrounded on all its sides by a plurality of the open cell 24. As distinguished from the panel of FIG. 1, however, panel 20 illustrated in FIGS. 2 and 3 includes only one type of open cell 24 (rather than three types) and only one type of closed cell 26. Also, all the open and closed cells are of substantially the same configuration, namely of a square pyramidal configuration.

Figure 2:
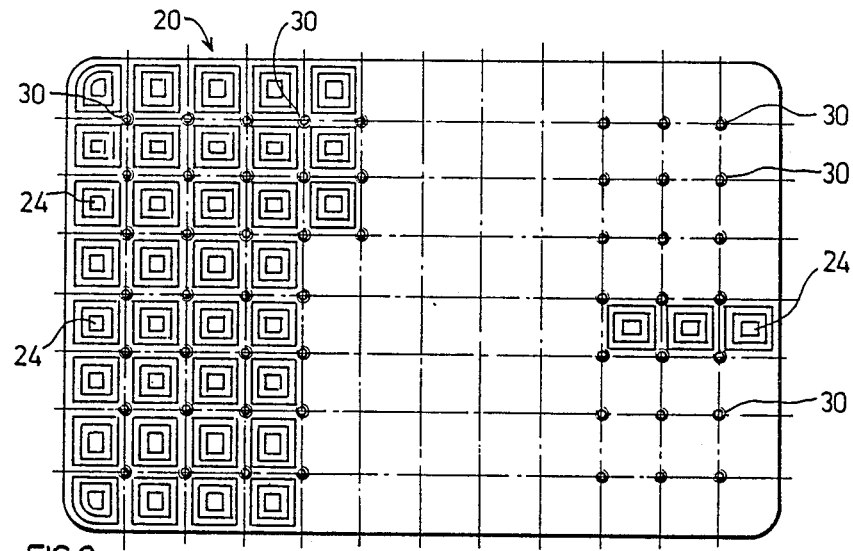
FIG. 2 is a view illustrating the bottom face of a second panel constructed in accordance with the present invention.
Figure 3:
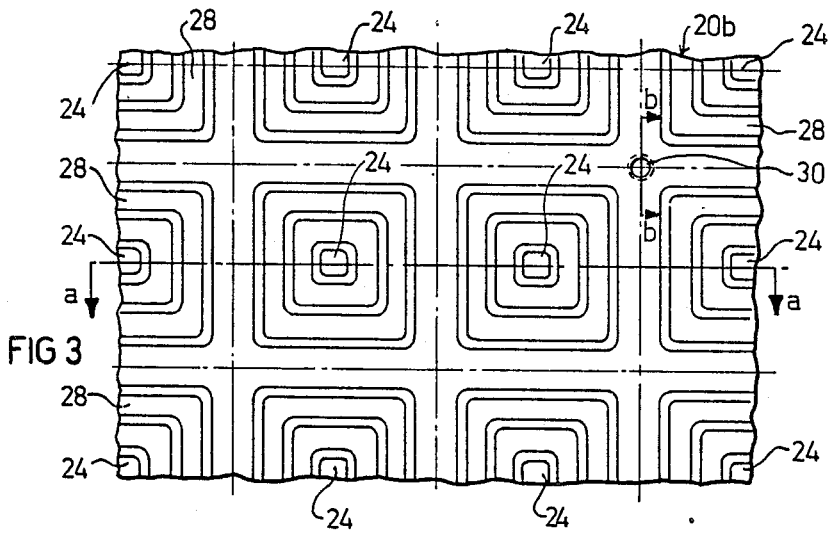
FIG. 3 is an enlarged fragmentary view more particularly illustrating the bottom face of the panel of FIG. 2.
Figures 3A, 3B:
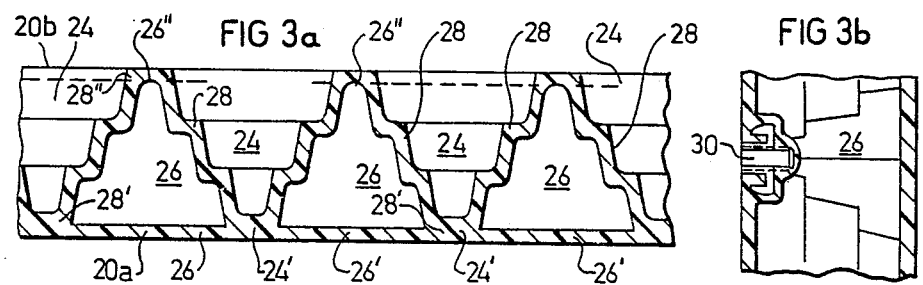
FIGS. 3a and 3b are sectional views along lines a—a and b—b, respectively, of FIG. 3.

In addition, whereas the walls 8 in the embodiment of FIG. 1, between the closed and open cells, are straight, in the embodiment of FIGS. 2 and 3, the walls, therein designated 28, are of stepped configuration, as shown particularly in FIG. 3a, to provide resistance against buckling in compression, because of the larger thickness of the panel. The ends of walls 28, adjacent to the opposite faces 20a, 20b of the panel, are thickened, as shown at 28' and 28", respectively.

As can be seen particularly in FIG. 3a, face 20a of panel 20 is constituted of the closed wall 26' at the base of all the pyramidal closed cells 26, alternating with walls 24' at the apices of the pyramidal open cells 24; whereas face 20b of the panel is constituted of the base of the open cells 24, alternating with the closed apex walls 26" of the closed cells 26. Thus, face 20a of the panel will be smooth and uninterrupted, whereas face 20b of the panel will have an interrupted or ribbed configuration.

FIGS. 2 and 3 further illustrate the provision of a threaded insert 30 embedded in a face 20b of the panel, for receiving a fastener or the like for attachment purposes. Panel 20 illustrated in FIGS. 2 and 3 may be produced by rotational moulding, in the same manner as described above with respect to panel 2 illustrated in FIG. 1, whereupon the threaded insert 30 would be removably carried on one of the mould plates so as to be embedded by the plastic powder moulded thereon. It will be appreciated that a similar fastener insert may be provided in panel 2 illustrated in FIG. 1.

While the invention has been described with respect to two preferred embodiments, it will be appreciated that many other variations may be made. For example, instead of surrounding each open cell with four closed cells, and each closed cell with four open cells, each cell of one type may be surrounded by a different number of cells of the other type, for example 3, 5, 6, or more. Further, while one face of the panel would always have an interrupted or ribbed surface (namely face 2b or face 20b in the illustrated embodiments) the other face of the panel (2a, 20b) need not be non-interrupted, as it too could be provided with ribs for strengthening or decorative purposes. Many other variations, modifications, and applications of the invention will be apparent.

What is claimed is:

1. A panel having high strength relative to its weight, said panel being made of rigid material integrally moulded with a rectangular matrix of longitudinally and transversely-extending cells, each including side and face walls; said matrix of cells comprising a plurality of separate and distinct open cells, each open at one face of the panel, and a plurality of separate and distinct closed cells, each closed on all sides and having a face wall on the opposite face of the panel; each of said open cells being surrounded on all its sides by side walls of a plurality of said closed cells; each of said closed cells being surrounded on all its sides by side walls of a plurality of said open cells.

2. The panel according to claim 1, wherein said rigid material is a rigid plastic material.

3. The panel according to claim 1, wherein said opposite face of the panel is uninterrupted and is constituted of a face wall of all the closed cells alternating with a face wall of at least some of the open cells.

4. The panel according to claim 1, wherein said one face of the panel includes a plurality of open cells of different configurations symmetrically distributed over said one face of the panel.

5. The panel according to claim 4, wherein some of said open cells are of circular cross-section, and some are of rectangular cross-section.

6. The panel according to claim 5, wherein said open cells of rectangular cross-section include cells of square cross-section and cells of elongated-rectangular cross-section, the latter having a pair of short sides each of a length equal to the diameter of the cells of circular cross-section, and a pair of long sides each of a length equal to the length of each side of the cells of square cross-section.

7. The panel according to claim 6, wherein said one face of the panel includes a plurality of first lines of open cells alternating with a plurality of second lines of open cells; each of said first lines including cells of circular cross-section alternating with cells of elongated-rectangular cross-section aligned along their short sides with the cells of circular cross-section; each of said second lines including cells of square cross-section alternating with cells of elongated-rectangular cross-section and aligned with the long sides thereof.

8. The panel, according to claim 7, wherein said closed cells having a face wall on said opposite face of the panel are aligned in the panel-thickness direction with the open cells of circular cross-section having an open end on said one face of the panel.

9. The panel, according to claim 1, wherein said open cells are of tapered configuration, being of largest dimension at their open sides disposed in said one face of the panel.

10. The panel according to claim 9, wherein said closed cells are also of tapered configuration, being of largest dimension at said opposite face of the panel.

11. The panel according to claim 1, wherein the walls of said open and closed cells are thicker at the faces of the panel than within the panel.

12. The panel according to claim 1, wherein the side walls of said open cells separating them from the closed cells are substantially straight.

13. The panel according to claim 1, wherein the side walls of said open cells separating them from the closed cells are stepped to provide resistance against buckling in compression.

14. The panel according to claim 1, wherein said opposite face of the panel is constituted of a face wall of all the open and closed cells, and said one face of the panel is constituted only of the open sides of the open cells.

15. The panel according to claim 14, wherein said open and closed cells are all of the same configuration.

16. The panel according to claim 15, wherein said open and closed cells are all of a square pyramidal configuration.

17. The panel according to claim 16, wherein said open and closed cells all of square pyramidal configuration include stepped side walls to provide resistance against buckling in compression.

18. The panel according to claim 1, further including threaded inserts embedded in one face of the panel.

19. The panel according to claim 1, wherein the panel is made by rotational moulding.

* * * * *